(12) United States Patent
Tsirkin (10) Patent No.: US 10,216,453 B1
(45) Date of Patent: Feb. 26, 2019

(54) REVERSE SLOT INVALIDATION FOR POINTER RINGS

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/690,774

(22) Filed: Aug. 30, 2017

(51) Int. Cl.
*G06F 12/00* (2006.01)
*G06F 3/06* (2006.01)

(52) U.S. Cl.
CPC .......... *G06F 3/0652* (2013.01); *G06F 3/0604* (2013.01); *G06F 3/067* (2013.01); *G06F 3/0656* (2013.01); *G06F 3/0664* (2013.01)

(58) Field of Classification Search
CPC .... G06F 3/0652; G06F 3/0604; G06F 3/0656; G06F 3/0664
See application file for complete search history.

(56) References Cited

U.S. PATENT DOCUMENTS

| | | |
|---|---|---|
| 7,242,736 B2 | 7/2007 | Schanke et al. |
| 8,760,460 B1 | 6/2014 | Kilgariff et al. |
| 9,178,805 B2 | 11/2015 | Goel |
| 9,197,539 B2 | 11/2015 | Cors et al. |
| 9,197,543 B2 | 11/2015 | Brendel et al. |
| 9,379,957 B1 | 6/2016 | Pi |
| 2006/0050722 A1 | 3/2006 | Bury et al. |

OTHER PUBLICATIONS

Stack Overflow; Ring buffer: Disadvantages by moving through memory backwards? https://stackoverflow.com/questions/17128491/ring-buffer-disadvantages-by-moving-through-memory-backwards?rq=1; Jun. 2013, pp. 1-3.
Cisco; Network Implications of Server Virtualization in the Data Center—Cisco; http://www.cisco.com/c/en/us/solutions/collateral/data-center-virtualization/net_implementation_white_paper0900aecd806a9c05.html; retrieved Mar. 28, 2017; pp. 1-7.
Rahul Sharma; Techniques to Improve Network I/O Performance; Department of Computer Science and Engineering Indian Institute of Technology Bombay Mumbai 400076 (India); Apr. 22, 2016; (29 pages).

*Primary Examiner* — Matthew Bradley
(74) *Attorney, Agent, or Firm* — K&L Gates LLP (57) ABSTRACT

A reverse slot invalidation system includes a first memory including a ring buffer, second memory, and processor in communication with the first memory. The processor includes a consumer processor and a producer processor. The consumer processor is configured to detect a request to record a memory entry in the second memory, retrieve up to a predetermined quantity of memory entries in the ring buffer from an original slot to an end slot, and test a respective value of each successive slot from the original slot through the end slot while the respective value of each successive slot in the ring buffer remains unchanged. The consumer processor is configured to record respective valid values in the second memory. Additionally, the consumer processor is configured to walk the ring buffer backwards from the end slot to the original slot, and invalidate each slot between the end slot and the original slot.

20 Claims, 7 Drawing Sheets

REVERSE SLOT INVALIDATION FOR POINTER RINGS

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to virtual machine memory.

SUMMARY

The present disclosure provides new and innovative systems and methods for reverse slot invalidation for pointer rings. In an example, a system includes a first memory including a ring buffer having a plurality of slots, a second memory, and at least one processor in communication with the first memory. The at least one processor includes a consumer processor and a producer processor. The consumer processor is configured to detect a request to record at least one memory entry in the second memory, retrieve up to a predetermined quantity of memory entries in the ring buffer from an original slot to an end slot, and test a respective value of each successive slot from the original slot through the end slot while the respective value of each successive slot in the ring buffer remains unchanged. Each respective value is associated with a corresponding respective memory entry in each respective successive slot from the original slot through the end slot. Responsive to receiving a valid value from the test, the consumer processor is configured to record the respective value in the second memory. Additionally, the consumer processor is configured to walk the ring buffer backwards from the end slot to the original slot, and invalidate each slot between the end slot and the original slot.

In an example, a method includes detecting, by a consumer processor, a request to record at least one memory entry from a first memory including a ring buffer in a second memory. Additionally, the consumer processor retrieves up to a predetermined quantity of memory entries in the ring buffer from an original slot to an end slot. Then, the consumer processor tests a respective value of each successive slot from the original slot through the end slot while the respective value of each successive slot in the ring buffer remains unchanged. Each respective value is associated with a corresponding respective memory entry in each respective successive slot from the original slot through the end slot. Responsive to receiving a valid value from the test, the consumer processor records the respective value in the second memory. The consumer processor walks the ring buffer backwards from the end slot to the original slot, and invalidates each slot between the end slot and the original slot.

In an example, a non-transitory machine-readable medium stores code, which when executed by a processor, is configured to detect a request to record at least one memory entry from a first memory including a ring buffer in a second memory, retrieve up to a predetermined quantity of memory entries in the ring buffer from an original slot to an end slot, and test a respective value of each successive slot from the original slot through the end slot while the respective value of each successive slot in the ring buffer remains unchanged. Each respective value is associated with a corresponding respective memory entry in each respective successive slot from the original slot through the end slot. The non-transitory machine-readable medium is configured to record the respective value in the second memory responsive to receiving a valid value from the test. Additionally, the non-transitory machine-readable medium is configured to walk the ring buffer backwards from the end slot to the original slot, and invalidate each slot between the end slot and the original slot.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for reverse slot invalidation for pointer rings when copying data from one memory location (e.g., ring buffer) to a different memory. For example, the techniques disclosed may be used when forwarding incoming network traffic to a virtual machine by a hypervisor, which may include receiving a packet from a network interface controller (NIC) in hypervisor memory and recording or copying the packet into virtual machine memory. The act of receiving the data (e.g., packets) and copying the data may be executed on the same processor (e.g., CPU), however, parallelizing the actions on separate processors or separate processor cores may provide significant performance advantages. Currently, techniques of parallelizing the receiving and copying may involve a first CPU receiving an interrupt from a NIC, receiving packets from the NIC, and adding the packets to a list in a shared memory. A second CPU runs a thread to retrieve the packets from the list and record copy the packets into VM memory. Because the parallel process utilizes two CPUs, the process adds additional overhead because adding and removing packets on one list requires cross-CPU communication through shared memory. Traditionally, a linked list or a producer/consumer ring was used without much added performance as false cache sharing typically outweighed the benefits of parallelism.

Additionally, other approaches such as a typical circular buffer design often creates cache line bounces between the two CPUs. For example, a ring data structure (e.g., an array with a plurality of slots) may be used with a producer processor and a consumer processor (or producer CPU and consumer CPU). In the disclosed implementation, an interrupt handling processor or producer processor may maintain a producer pointer. The producer pointer may store data, such as the address of each packet received at the slot addressed by the producer pointer. The producer processor may increment the pointer to address the next slot, thereby wrapping around at the end of the array. To avoid overruns, before storing the data (e.g., the address of each packet and/or packet), the producer processor may test the value in each slot. If the value is valid (e.g., not NULL or non-NULL), the data is not stored in the list and may be discarded. A data copying processor or consumer processor may maintain a consumer pointer. The consumer processor may test the value pointed to by the consumer pointer. If the value is invalid (e.g., NULL), then the array is empty and the consumer processor may stop and wait for more packets. If the value is valid (e.g., not NULL or non-NULL), the consumer processor may retrieve the data, such as a packet address. Then, the consumer processor may invalidate the slot (e.g., write or store NULL value into the slot) and may advance the consumer pointer to the next slot. The retrieved data may be copied to a second memory location (e.g., virtual machine memory).

Invalidating a slot (e.g., storing a NULL value in a slot) advantageously allows reuse of the slot for additional data (e.g., forwarding a new packet). However, this data structure may experience performance bottlenecks. For example, when a driver is highly optimized, copying or recording may be slower than receiving packets. Thus, the ring may be full for a large part of the time, and as a result, as each packet slot is invalidated by the consumer processor, the packet slot is immediately made valid again by the interrupt handling processor or producer processor, which causes a cache line to bounce between the processors and results in a significant slowdown. Due to the bottleneck and resulting slowdown, the consumer processor may be unable to get ahead of the producer processor resulting in cache line bounces for each data operation in the ring buffer.

A proposed solution to the cache line bounces described above was to reserve extra slots in the ring, which would remain unused to space out the producer thread and consumer thread such that they were not accessing the same cache line. However, ring size is often designed in powers of two to allow optimization. If a ring with 128 active slots is needed, then by adding unused slots, the implemented ring would be designed with 256 slots (e.g., next power of two above 128 slots). For example, if 128 active slots will be utilized, and 10 slots will remain unused, then the ring needs a minimum of 138 slots. Due to the common practice of increasing ring buffer size by a factor of two, the next logical ring buffer size is 256 slots (e.g., next largest size up from 128 slots). However, larger rings are problematic because the processors keep watch over the ring, and a larger ring puts more pressure on cache. Moreover, only actively using, for example, 128 slots of 256 slots is not an efficient use of hardware resources.

As described in the various example embodiments disclosed herein, to prevent slowdown and reduce the frequency of cache line bounces, the consumer processor retrieves up to a predetermined quantity of memory entries (e.g., data such as packet addresses) in the ring. For example, for each successive slot in the ring, the consumer processor may test the respective value of each slot without invaliding the slots. Thus, the consumer processor may test the predetermined quantity of memory entries in the slots or may stop testing the slots upon reaching an invalid or NULL value in a slot (e.g., there are no more memory entries in the ring). Then, the consumer processor may walk the ring backwards until the consumer processor reaches the original location and may invalidate each of the slots while walking backwards. The retrieved memory entries (e.g., packet addresses) may be copied into a second memory location (e.g., virtual machine memory). Due to invalidating slots in groups, the producer processor is held back and only starts adding new entries in the ring after the consumer processor has made progress. Thus, the consumer processor may advantageously retrieve a group of packets elsewhere in the ring (e.g., a few slots ahead of the producer processor) such that retrieving a single packet no longer causes cache line bounces between the producer processor and consumer processor even when the ring is full or almost full. Thus, cache line bounces are advantageously reduced and performance is improved. For example, the above consumer processor modification may improve packet throughput by approximately 10 percent or more.

Instead of the cache line constantly bouncing between the producer processor and consumer processor, the consumer processor retrieves and invalidates up to a predetermined quantity of memory entries at a time, which advantageously allows the consumer processor to retrieve multiple memory entries before the cache line bounces to the producer processor, thereby improving performance and throughput without doubling the ring size as described above.

Figure 1:
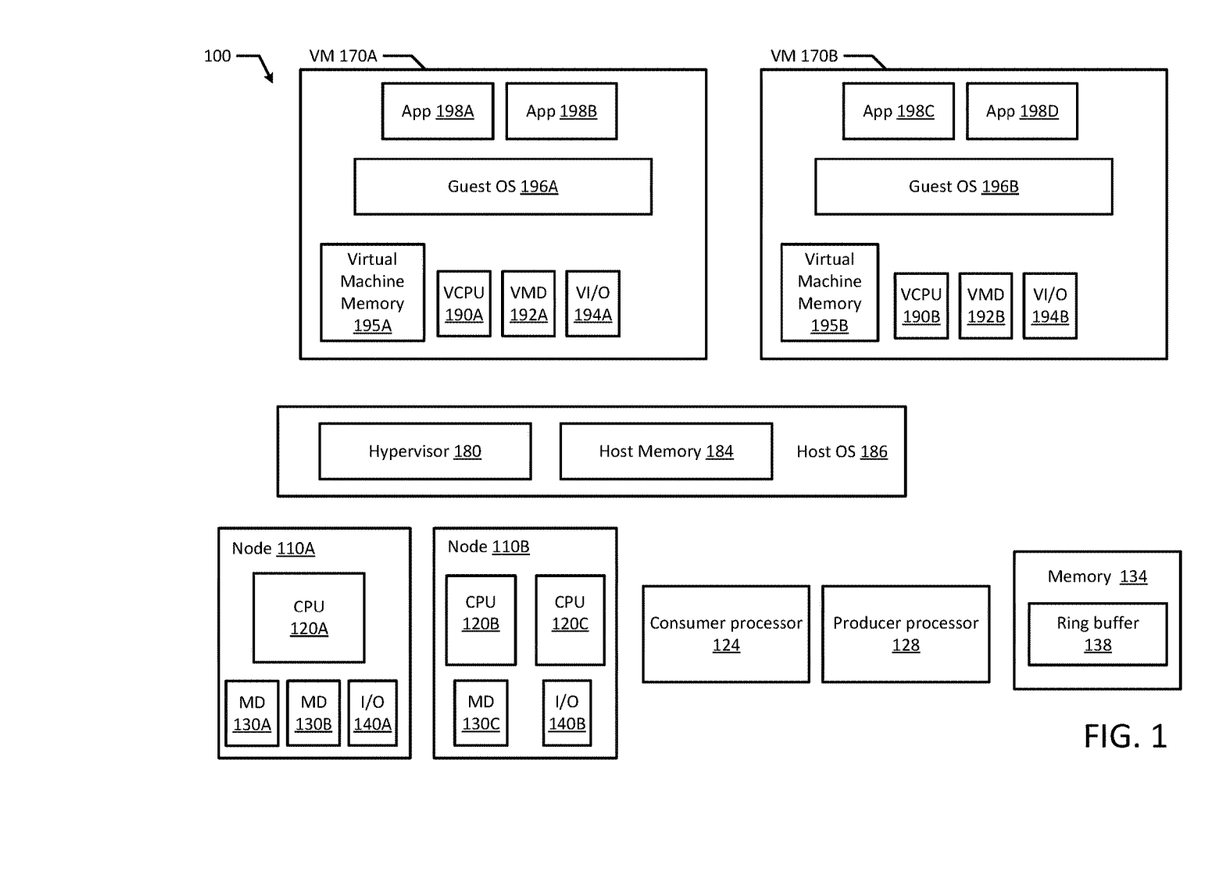
FIG. 1 illustrates a block diagram of an example computing system according to an example embodiment of the present disclosure.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-B), a consumer processor 124, a producer processor 128, and memory 134 including a ring buffer 138. Ring buffer 138 may be a data structure using a single, fixed-size buffer as if it were connected end-to-end (e.g., in a ring). In an example, the ring buffer 138 may be a first-in-first-out (FIFO) data structure. For example, memory entries such as packet addresses may be written into and retrieved from the ring buffer 138. Additionally, the ring buffer 138 may have a plurality of slots, which may store memory entries. The slots may be tracked by pointers or indices.

Virtual machines 170A-B may include a guest OS, guest memory, a virtual CPU (VCPU), virtual memory devices (VIVID), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 194. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VIVID 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-B. Each node 110A-B may in turn include one or more physical processors (e.g., CPU 120A-C) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, consumer processor 124 and producer processor 128 may be one of the other processor(s) illustrated in FIG. 1, such as a CPU (e.g., CPU 120A-C) on node 110A-B. Similarly, ring buffer 138 may be stored in a memory device, and may be one of the other memory(s) illustrated in FIG. 1, such as MD130A-C on node 110A-B. Additionally, consumer processor 124 and producer processor 128 may be different cores on the same physical processor. The consumer processor 124 may be configured to retrieve memory entries from the ring buffer 138 by testing values of slots to determine whether the slots contain a valid value (e.g., memory entry) or an invalid value (e.g., NULL value). The consumer processor 124 may also be configured to invalidate slots in batches, for example, by walking the ring buffer 138 backwards after retrieving memory entries from up to a predetermined quantity of slots. By invalidating the predetermined quantity of slots in batches, the consumer processor prevents cache line bounces after each memory entry retrieval, thereby improving performance and throughput.

As used herein, physical processor or processor 120A-C, 124, and 128 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2A:
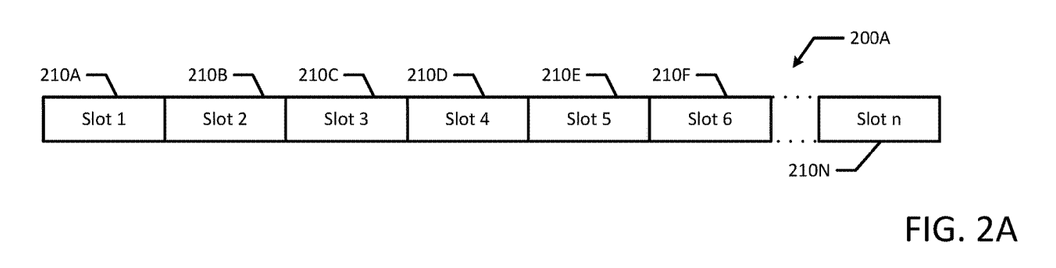
FIG. 2A illustrates a block diagram of an example memory ring according to an example embodiment of the present disclosure.
Figure 2B:
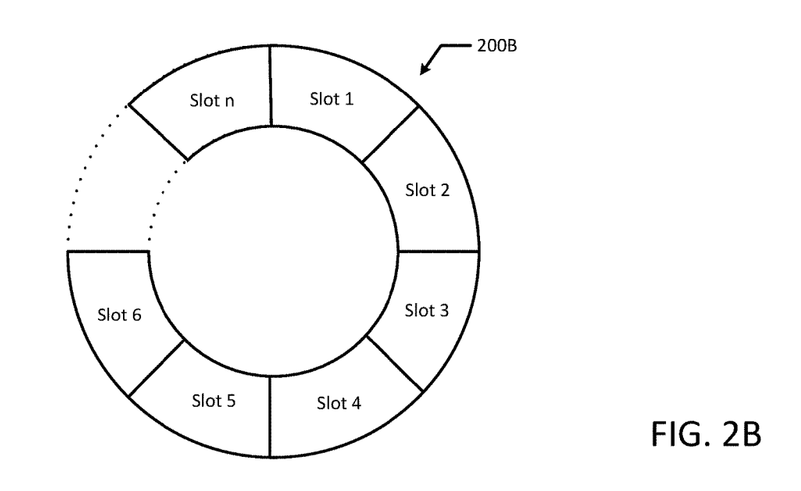
FIG. 2B illustrates a block diagram of an example memory ring according to an example embodiment of the present disclosure.

FIGS. 2A and 2B illustrate block diagrams of example ring buffers 200A and 200B. For example, FIG. 2A illustrates a linear buffer implementation of ring buffer 200A while FIG. 2B illustrates the "ring" structure of ring buffer 200B. It should be appreciated that ring buffers 200A-B may be the same actual memory structure illustrated in two different ways. Ring buffers 200A-B may in be located in cacheable memory, such as L1 cache if on the same physical processor but on different CPU cores. In another example, the ring buffer 200A-B may be on a different level of cache other than L1. Additionally, ring buffers 200A-B may include a plurality of slots (e.g., slots 210A-N). For example, slots 210A-N may correspond to Slot_1 to Slot_n respectively. Each slot may include a memory entry, such as a data packet, a packet address, or the like. Additionally, slots may be empty or may include an invalid value, such as "0". For example, a slot with a memory address of "0" or a NULL value may be used to indicate an empty slot or invalid slot. Valid slots may include a memory entry, such as a data packet or a packet address.

Figure 3:
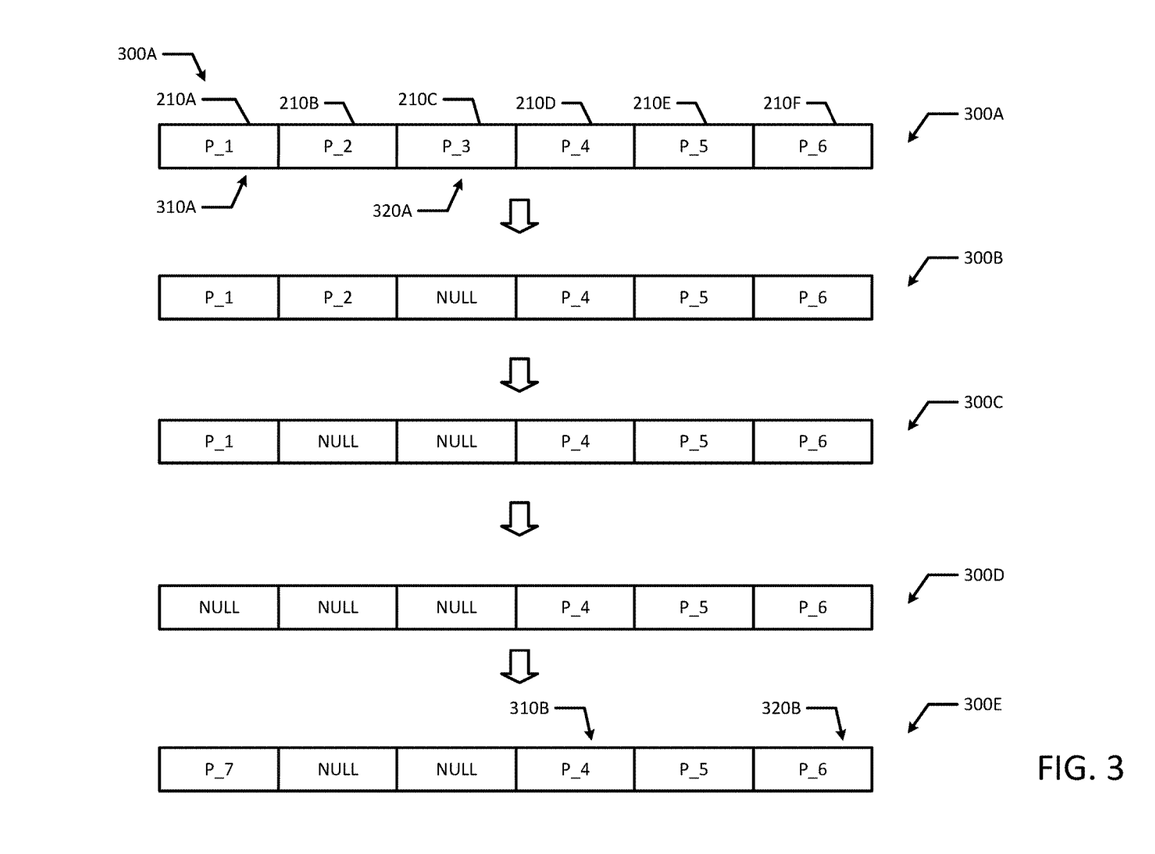
FIG. 3 illustrates a block diagram of reverse slot invalidation of an example memory ring.

FIG. 3 illustrates a block diagram of reverse slot invalidation of an example memory ring, such as ring buffer 138 or 200A-B. For example, memory ring 300 is illustrated as 300A-E, which represent different states of memory ring 300 at different points in time. Memory ring or ring buffer 300 may include six slots (e.g., slots 210A-F). In an example, each slot may include a memory entry, such as a packet address P_1 to P_6. As illustrated in ring buffer 300A, a first slot (e.g., slot 210A) includes packet address P_1, slot 210B includes packet address P_2, slot 210C includes packet address P_3, slot 210D includes packet address P_4, slot 210E includes packet address P_5, and slot 210F includes packet address P_6. Packet addresses may be written into the memory ring or ring buffer 300 by a producer processor, such as producer processor 128. Additionally, ring buffer 300A may include an index or pointer designating an original slot 310A and an end slot 320A. In an example, the index may be a registry. A consumer processor may retrieve memory entries, such as packet addresses from a predetermined quantity of slots (e.g., slots 210A-C). After retrieving the packet addresses, the consumer processor 124 may invalidate the group of slots (e.g., slots 210A-C).

As illustrated by ring buffers 300B-D, the consumer processor 124 may walk the ring 300 backwards and invalidate each slot from the end slot 320A to the original slot 310A. For example, the consumer processor 124 may invalidate slot 210C by writing an invalid value (e.g., NULL value) into the slot. Then, the consumer processor 124 may invalidate slot 210B by writing or storing a NULL value into the slot 210B. Similarly, consumer processor 124 may invalidate the original slot 310A (e.g., slot 210A) by writing or storing a NULL value into slot 210A. After each slot (e.g., slot 210A-C) has been invalidated, the consumer pointer is positioned at a new original slot 310B (e.g., slot 210D with packet address P_4), as illustrated in ring buffer 300E. Similar to the reverse slot invalidation described above for slots 210A-C, the consumer processor 124 may proceed consuming additional memory entries, such as packet addresses or data packets, from the new original slot 310B to a new end slot 320B. Once the consumer has invalidated the slots, the producer processor 128 may store additional memory entries, such as packet address P_7 into ring buffer 300. For example, the producer processor 128 may store P_7 in slot 210A after the consumer processor 124 is done accessing the cache line for slot 210A, which advantageously reduces the frequency of cache line bounces between the consumer processor 124 and producer processor 128. For example, the consumer processor retrieves multiple memory entries before invalidating any of the entries, thereby holding back the producer processor and advantageously preventing the frequency of cache line bounces without increasing ring size.

As illustrated in FIG. 3, the predetermined quantity of slots is three, however, other predetermined quantities may be used. For example, the predetermined quantity may be two, four, ten, etc. In an example, the predetermined quantity may be associated with the size of the ring buffer 138. For example, the predetermined quantity may be a fraction of the size of the ring buffer 138 (e.g., 1/16 of a ring, 1/8 of a ring, or 1/4 of a ring). In an example, if the predetermined quantity is 1/16 of a ring with 128 slots, then the predetermined quantity may be 8 slots. Similarly, the predetermined quantity may also be related to the quantity of cache lines used by the ring buffer 138. For example, if the ring buffer 138 uses four cache lines (e.g., 32 slot ring where each slot is 8 bytes and four cache lines of 64 bytes), then the predetermined quantity of slots may be the quantity of slots dedicated to a single cache line (e.g., 8 slots), which may advantageously prevent cache line bounces between the producer processor 128 and the consumer processor 124 because each processor may be accessing different cache lines. For example, after the consumer processor 124 consumes and invalidates the predetermined quantity of slots in a first cache line, it may start consuming additional slots in a different cache line (e.g., second cache line) as the producer processor 128 is producing memory entries or data packets to slots in the first cache line, thereby allowing the producer processor 128 and the consumer processor 124 to simultaneously execute memory operations in separate cache lines.

Figure 4:
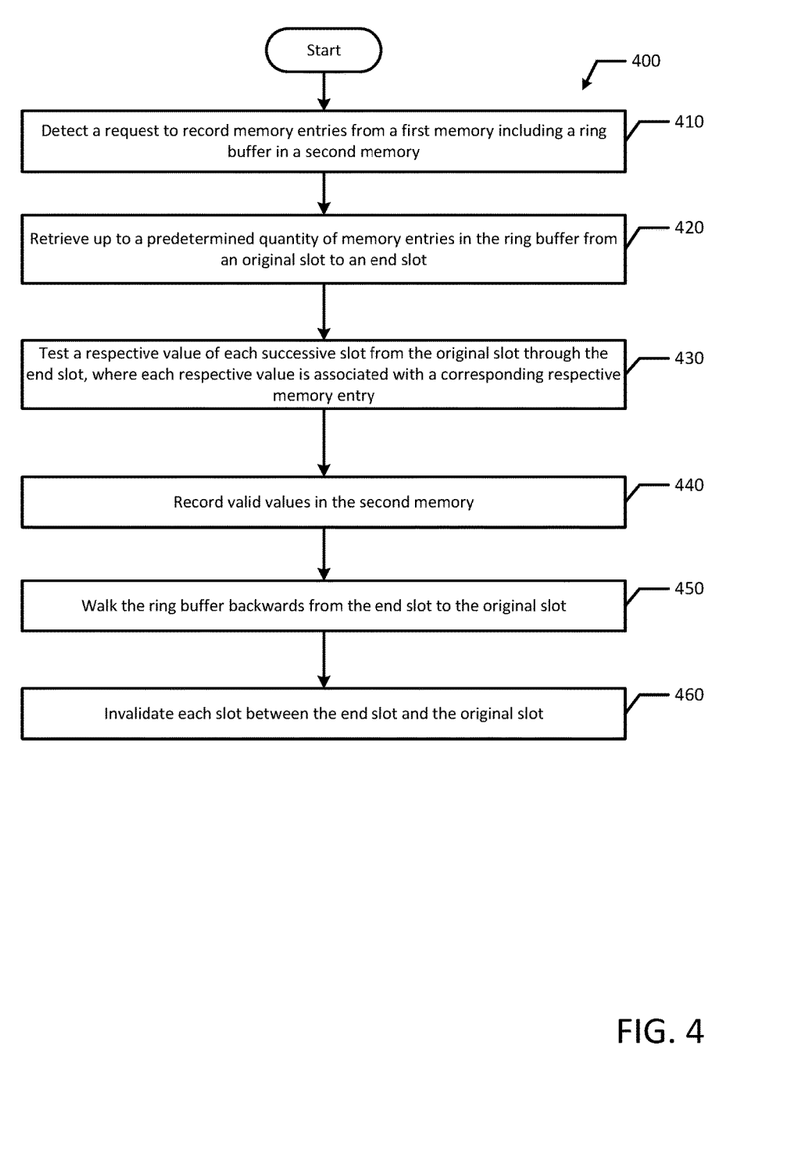
FIG. 4 illustrates a flowchart of an example process for reverse slot invalidation according to an example embodiment of the present disclosure.

FIG. 4 illustrates a flowchart of an example method 400 for reverse slot invalidation according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes detecting a request to record memory entries from a first memory including a ring buffer in a second memory (block 410). For example, a consumer processor 124 may detect a request to record (e.g., copy) at least one memory entry from a ring buffer 138 into a second memory, such as virtual machine memory 195A. In an example, the consumer processor 124 may detect a request after a producer processor 128 adds additional memory entries to the ring buffer 138. For example, the consumer processor 124 may detect a request after a predetermined quantity of memory entries has been added to the ring buffer 138. Additionally, the consumer processor 124 may detect a request from a virtual machine (e.g., VM 170A-B). Then, the consumer processor may retrieve up to a predetermined quantity of memory entries in the ring buffer from an original slot to an end slot (block 420). For example, after the consumer processor 124 detects the request, the consumer processor 124 may retrieve up to a predetermined quantity of memory entries in the ring buffer 138 from an original slot 310A to an end slot 320A. For example, if the predetermined quantity is three slots, then the consumer processor may retrieve up to three memory entries from the ring buffer 138. If some of the predetermined quantity of slots include an invalid value (e.g., NULL value), the consumer processor 124 may retrieve less than three memory entries from the ring buffer 138. For example, the consumer processor 124 may advantageously retrieve and copy less than the predetermined quantity to increase efficiency and reduce downtime associated with waiting for additional packets to be produced by the producer processor 128, which may cause undue delays when there is a slowdown of incoming network traffic.

In an example, the consumer processor 124 may be paused or may wait before attempting to consume additional memory entries. For example, after testing a slot and receiving or reading an invalid value (e.g., NULL value), a timer may start and count up to a predetermined timespan (e.g., 25 milliseconds, one second, 20 seconds) before the consumer processor 124 attempts to consume additional memory entries. In another example, a counter may be used to count packets produced by the consumer processor 128, and the consumer processor may start consuming packets after the counter reaches a threshold quantity of packets. In another example, the consumer processor 124 may pause after testing a slot with an invalid value (e.g., NULL value) until it receives an additional request to record memory entries from the producer processor 128.

The consumer processor may test a respective value of each successive slot from the original slot through the end slot, where each respective value is associated with a corresponding respective memory entry (block 430). For example, the consumer processor 124 may test respective values of each successive slot while the respective value of each successive slot in the ring buffer 138 remains unchanged. In an example, if a test on the third slot returns an invalid value (e.g., NULL value), the consumer processor 124 may retrieve memory entries from the first and second slots (e.g., less than the predetermined quantity of three slots). For example, a NULL value may indicate that the remainder of the ring buffer 138 is empty and the consumer processor retrieves less than the predetermined quantity. Additionally, the consumer processor 124 may stop testing slots responsive to receiving an invalid value (e.g., NULL value) from one of the successive slots from the original slot 310A through the end slot 320A. Alternatively, if an invalid value (e.g., NULL value) is not received, the consumer processor 124 may stop testing responsive to retrieving a predetermined quantity of memory entries in the ring buffer 138.

The consumer processor may also record valid values in the second memory (block 440). For example, responsive to receiving a valid value from the test, the consumer processor 124 may record the respective value in the second memory, such as virtual machine memory 195A. In an example, a valid value may be a non-NULL value such as a packet address. Then, the consumer processor may walk the ring buffer backwards from the end slot to the original slot (block 440). For example, the consumer processor 124 may successively walk the ring buffer 138 backwards from the end slot 320 (e.g., slot_3) to an intermediate slot 315 (e.g., slot_2) and then back to the original slot 310A (e.g., slot_1). In an example, walking the ring buffer 138 backwards may include counting the quantity of memory entries as the memory entries are retrieved by the consumer processor 124, thereby documenting the quantity of slots the consumer processor 124 needs to walk back to. Additionally, walking the ring buffer 138 backwards may include decrementing a counter while walking backwards. For example, the consumer processor 124 may decrement a counter for each slot that the consumer processor 124 walks back to determine when it reaches the original slot.

The consumer processor 124 may invalidate each slot between the end slot and the original slot (block 450). For example, while waking the ring buffer 138 backwards, the consumer processor 124 may invalidate each slot between the end slot 320A to the original slot 310A including both the end slot 320A and the original slot 310A. Invaliding each slot between the end slot 320A and original slot 310A may result in invalidating the intermediate slots between the end slot 320A and the original slot 310A or any combination of the intermediate slots, the end slot 320A and/or the original slot 310A. For example, referring back to FIG. 3, invalidating each slot between the end slot 320A and the end slot 310A may result in invalidating slots 210A-C, slots 210A-B, slots 210B-C, or slot 210B. In an example, multiple invalidation steps may occur iteratively after retrieving a predetermined quantity of memory entries or reading an invalid value (e.g., NULL value) in a slot. For example, multiple invalidation steps may occur to first invalidate slots 210A-B and then to invalidate slot 210C. In an example, invalidating each slot may include overwriting each slot with an invalid value. For example, invalidating each slot may include storing a NULL value, such as a "0" value in the slot. By invalidating each slot in a batch all together instead of after each retrieval, the producer processor 128 is advantageously held back from accessing the ring buffer 138 (e.g., cache line associated with slot in the ring buffer 138), which reduces the frequency and/or occurrence of a cache line bounce. For example, depending on the predetermined quantity used and the ring size, the producer processor 128 and consumer processor 124 may be accessing slots that are far enough away from each other (e.g., in different cache lines) that neither is accessing the same cache line at the same time. For example, a cache line may be 64 bytes, and a slot may be 8 bytes, thus a ring buffer 138 may take up multiple cache lines. If the producer processor 128 and the consumer processor 124 are producing and consuming memory entries in slots that are positioned more than 8 slots away from each other in the above example, the producer processor 128 and the consumer processor 124 may be utilizing different cache lines. Accordingly, in this example, the predetermined quantity may be 8 or more so the respective cache lines used by the producer processor 128 and the consumer processor 124 may not overlap thereby avoiding or minimizing cache line bounces.

After the original slot is invalidated, a cache line may bounce between the consumer processor 124 and the producer processor 128. For example, while the consumer processor 124 is accessing the ring buffer 138, the consumer processor 124 may access the cache line for the ring buffer 138. However, when the producer processor 128 needs to access the memory for the ring buffer 138, the producer processor 128 may request access to the cache line to determine the current state of the ring buffer 138 (e.g., what memory entries are present in the ring buffer 138), thereby causing a cache line bounce which may slow down the process of forwarding network traffic (e.g., data packets). In an example, a cache line may be 64 bytes wide. When either the consumer processor 124 or producer processor 128 needs to read or write a location in the ring buffer 128, the consumer processor 124 and/or producer processor 128 may check for a corresponding entry in the cache. For example, the cache may check for the contents of the requested memory location (e.g., ring slot) in any cache lines that may contain the address.

Figure 5A:
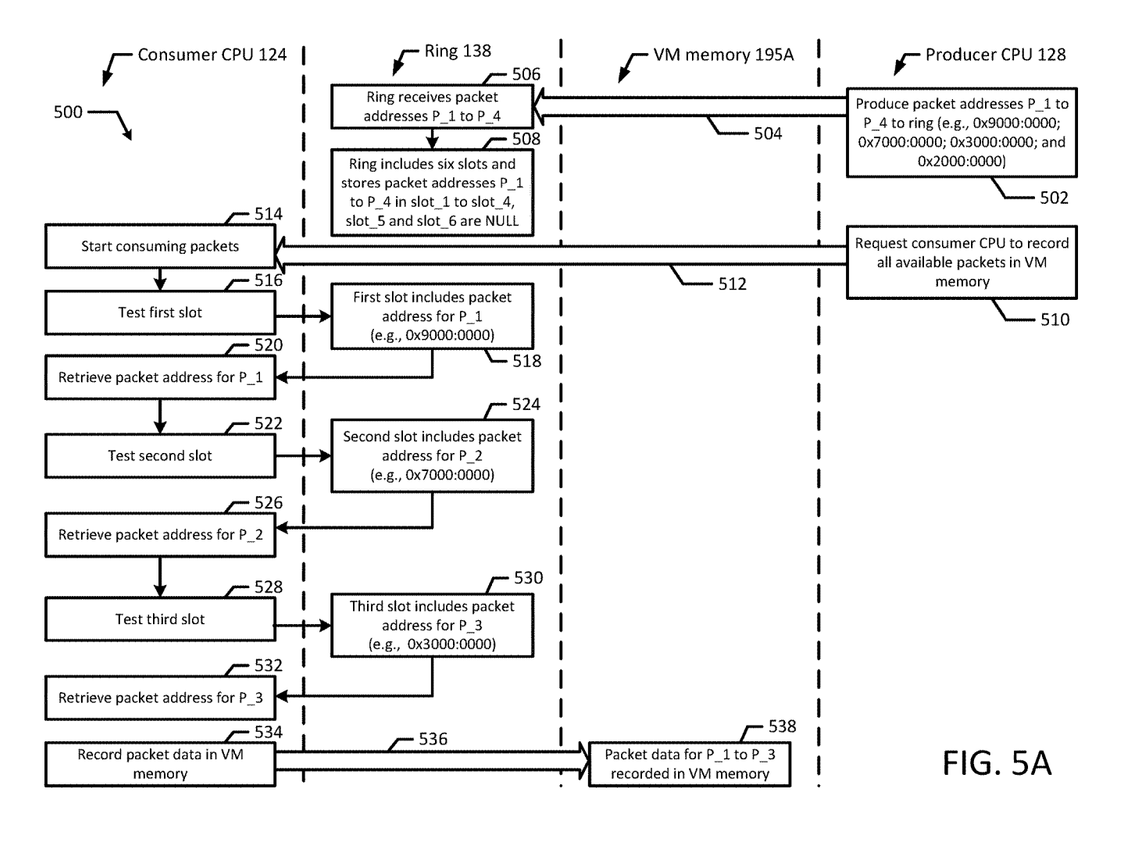
FIGS. 5A and 5B illustrate a flow diagram of an example process for reverse slot invalidation for pointer rings according to an example embodiment of the present disclosure.
Figure 5B:
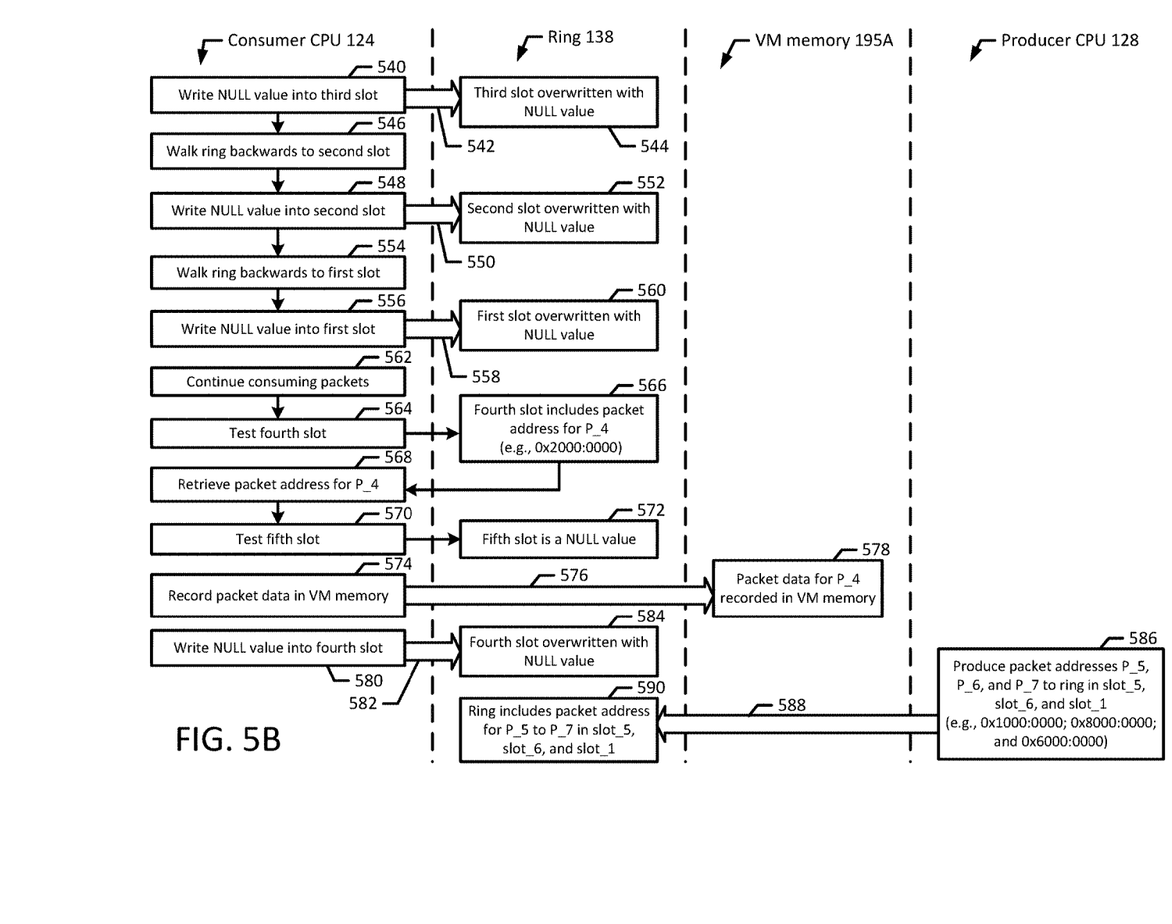

FIGS. 5A and 5B illustrate a flowchart of an example method 500 for reverse slot invalidation for pointer rings in accordance with an example embodiment of the present disclosure. Although the example method 500 is described with reference to the flowchart illustrated in FIGS. 5A and 5B, it will be appreciated that many other methods of performing the acts associated with the method 500 may be used. For example, the order of some of the blocks may be changed, certain blocks may be combined with other blocks, and some of the blocks described are optional. For example, a consumer processor 124 (e.g., consumer CPU) and a producer processor 128 (e.g., producer CPU) may communicate with a ring buffer 138 and virtual machine memory 195A to perform example method 500.

In the illustrated example, the producer CPU 128 may produce packet addresses P_1 to P_4 to ring buffer 138 (blocks 502 and 504). For example, the producer CPU may produce packet addresses 0.x9000:0000, 0x7000:0000, 0x3000:0000, and 0x2000:0000 corresponding to packet address P_1 to P_4 in four slots in the ring buffer 138 (e.g., first slot to fourth slot). Then, the ring buffer or ring 138 receives packet addresses P_1 to P_4 (block 506). For example, packet addresses P_1 to P_4 may be written in the ring 138. In an example, packet addresses P_1 to P_4 may be stored in the ring 138 by writing the packet address into the slot (e.g., replacing NULL value with packet address). In the illustrated example, the ring 138 includes six slots and stores packet addresses P_1 to P_4 in slot_1 to slot 4 while slot 5 and slot 6 are NULL (block 508).

Then, the producer CPU 128 may request the consumer CPU 124 to record all available packets in VM memory 195A (blocks 510 and 512). For example, the producer CPU 128 may forward incoming network traffic to a virtual machine (e.g., VM 170A) by producing packet addresses for the incoming network traffic to the ring buffer 138 and requesting the consumer CPU 124 to record the available packets (via the packet addresses) from the ring buffer into VM memory 195A. The consumer CPU may start consuming packets (block 514). In an example, the consumer CPU 124 may start consuming packets (e.g., packet addresses) after receiving the request from the producer CPU 128. Additionally, the consumer CPU 124 may detect the request.

The consumer CPU 128 may test the first slot (block 516). For example, the consumer CPU 128 may test slot_1 to determine the value of the memory entry or packet address in the slot. In the illustrated example, the first slot includes a packet address for P_1 (e.g., 0x9000:0000) (block 518). For example, the consumer CPU 124 may read slot_1 while testing the first slot to determine that the first slot includes a packet address of 0x9000:0000. Then, the consumer CPU 124 may retrieve the packet address for P_1 (block 520). In an example, the consumer CPU 124 may store the packet address for P_1 in a temporary memory location, which will later be copied to VM memory 195A.

After testing the first slot, the consumer CPU 124 may test the second slot (block 522). For example, the consumer CPU 128 may test slot_2 to determine the value of the memory entry or packet address in the slot. In the illustrated example, the second slot includes a packet address for P_2 (e.g., 0x7000:0000) (block 524). For example, the consumer CPU 124 may read slot_2 while testing the second slot to determine that the second slot includes a packet address of 0x7000:0000. Then, the consumer CPU 124 may retrieve the packet address for P_2 (block 526). Similar to P_1, the packet address for P_2 may also be stored in a temporary memory location.

After testing the second slot, the consumer CPU 124 may test the third slot (block 528). For example, the consumer CPU 128 may test slot_3 to determine the value of the memory entry or packet address in the slot. In the illustrated example, the third slot includes a packet address for P_3 (e.g., 0x3000:0000) (block 530). For example, the consumer CPU 124 may read slot_3 while testing the third slot to determine that the third slot includes a packet address of 0x3000:0000. Then, the consumer CPU 124 may retrieve the packet address for P_3 (block 532). As discussed above, the packet address (e.g., packet address for P_3) may be stored in a temporary memory location by the consumer.

Then, the consumer CPU 124 may record packet data in VM memory 195A (blocks 534 and 536). For example, the consumer CPU 124 may copy the data packets associated with the packet addresses P_1 to P_3 to VM memory 195A. In an example, the packet data may be copied to VM memory 195A from a temporary memory location. Then, packet data for P_1 to P_3 is copied to VM memory 195A (block 538). In an example, packet data for P_1 to P_3 may be copied to VM memory 195A in a batch. Additionally, packet data for P_1 to P_3 may be copied to VM memory 195A sequentially as each packet address is retrieved by the consumer CPU 124.

After retrieving a predetermined quantity of packet address from the ring buffer 138, the consumer CPU 124 may write a NULL value into the third slot (blocks 540 and 542). For example, the consumer CPU 124 may walk the ring 138 backwards from slot_3 to slot_1 and may invalidate slots sequentially from slot_3 to slot_1. Then, the third slot is overwritten with a NULL value (block 544). For example, slot_3 in the ring is invalidated, which enables it to be used by the producer CPU 128 in the future for additional network traffic data packets. After invalidating the third slot, the consumer CPU 124 may walk the ring backwards to the second slot (block 546). For example, the consumer CPU 124 may execute a walk function to walk the ring buffer 138. Then, the consumer CPU 124 may write a NULL value into the second slot (blocks 548 and 550). In an example, a memory address of "0" may represent a NULL value. The second slot is overwritten with a NULL value (block 552). For example, slot_2 in the ring 138 is invalidated, which enables slot_2 to be used by the producer CPU 128 for additional network traffic data packets. After invalidating the second slot, the consumer CPU 124 may walk the ring backwards to the first slot (block 554). For example, the consumer CPU 124 may execute a walk function to walk the ring buffer 138. Then, the consumer CPU 124 may write a NULL value into the first slot (blocks 556 and 558). The first slot is overwritten with a NULL value (block 560). For example, slot_1 in the ring 138 is invalidated, which enables slot_1 to be used by the producer CPU 128 for additional network traffic data packets. Invaliding the slots in batches or groups advantageously improves performance and throughput without increasing ring size, especially when a driver is highly optimized and copying or recording is slower than receiving packets.

After invalidating the slots, the consumer CPU 124 may continue consuming packets (block 562). For example, the consume CPU 124 may continue to consume packets until all available packets have been consumed and copied to VM memory 195A. The consumer CPU 124 may test the fourth slot (block 564). For example, the consumer CPU 128 may test slot 4 to determine the value of the memory entry or packet address in the slot. In the illustrated example, the fourth slot includes a packet address for P_4 (e.g., 0x2000:0000) (block 566). For example, the consumer CPU 124 may read slot 4 while testing the fourth slot to determine that the fourth slot includes a packet address of 0x2000:0000. Then, the consumer CPU 124 may retrieve the packet address for P_4 (block 568). In an example, the consumer CPU 124 may store the packet address for P_4 in a temporary memory location.

After testing the fourth slot, the consumer CPU 124 may test the fifth slot (block 570). For example, the consumer CPU 128 may test slot_5 to determine the value of the memory entry or packet address in the slot. In the illustrated example, the fifth slot includes a NULL value (block 572). For example, the consumer CPU 124 may read slot 5 while testing the fifth slot to determine that the fifth slot includes a packet address of "0" or NULL. In an example, the consumer CPU 124 or producer CPU 128 may not be allowed to store anything into memory address "0", which thus indicates a NULL value. Upon receiving a NULL value, the consumer CPU 124 may stop testing slots. For example, a NULL value may indicate that the remainder of the ring is empty and that there are currently no additional packets to copy or record into VM memory 195.

Then, the consumer CPU 124 may record packet data in VM memory 195A (blocks 574 and 576). For example, the consumer CPU 124 may copy the data packet associated with the packet addresses P_4 to VM memory 195A. In an example, the packet data may be copied to VM memory 195A from a temporary memory location. Then, packet data for P_4 is copied to VM memory 195A (block 578). In an example, packet data for P_4 may be copied to VM memory 195A as the packet address is retrieved by the consumer CPU 124.

Then, the consumer CPU 124 may write a NULL value into the fourth slot (blocks 580 and 582). The fourth slot is overwritten with a NULL value (block 584). For example, slot_4 in the ring 138 is invalidated, which enables slot_4 to be used by the producer CPU 128 for additional network traffic data packets. After the consumer CPU 128 has consumed the requested packets, the producer CPU 128 may produce packet addresses P_5, P_6, and P_7 to the ring 138 in slot_5, slot_6, and slot_1 (blocks 586 and 588). For example, the producer CPU 128 may produce packet addresses 0.x1000:0000, 0x8000:0000, and 0x6000:0000 corresponding to packet address P_5 to P_7 in three slots in the ring buffer 138 (e.g., fourth slot to first slot). In the illustrated example, the ring buffer 138 includes six slots, and the packet address for P_7 is written into empty slot P_1 (e.g., P_1 was invalidated with NULL value) because the producer CPU 128 wraps around the array after using the last slot. Then, the ring buffer or ring 138 receives packet addresses P_5 to P_7, which are stored or written into the ring 138 (block 590). After producing additional packet addresses to the ring 138, the producer CPU 128 may send additional requests to the consumer CPU 124 to record available packets into VM memory 195A.

Figure 6:
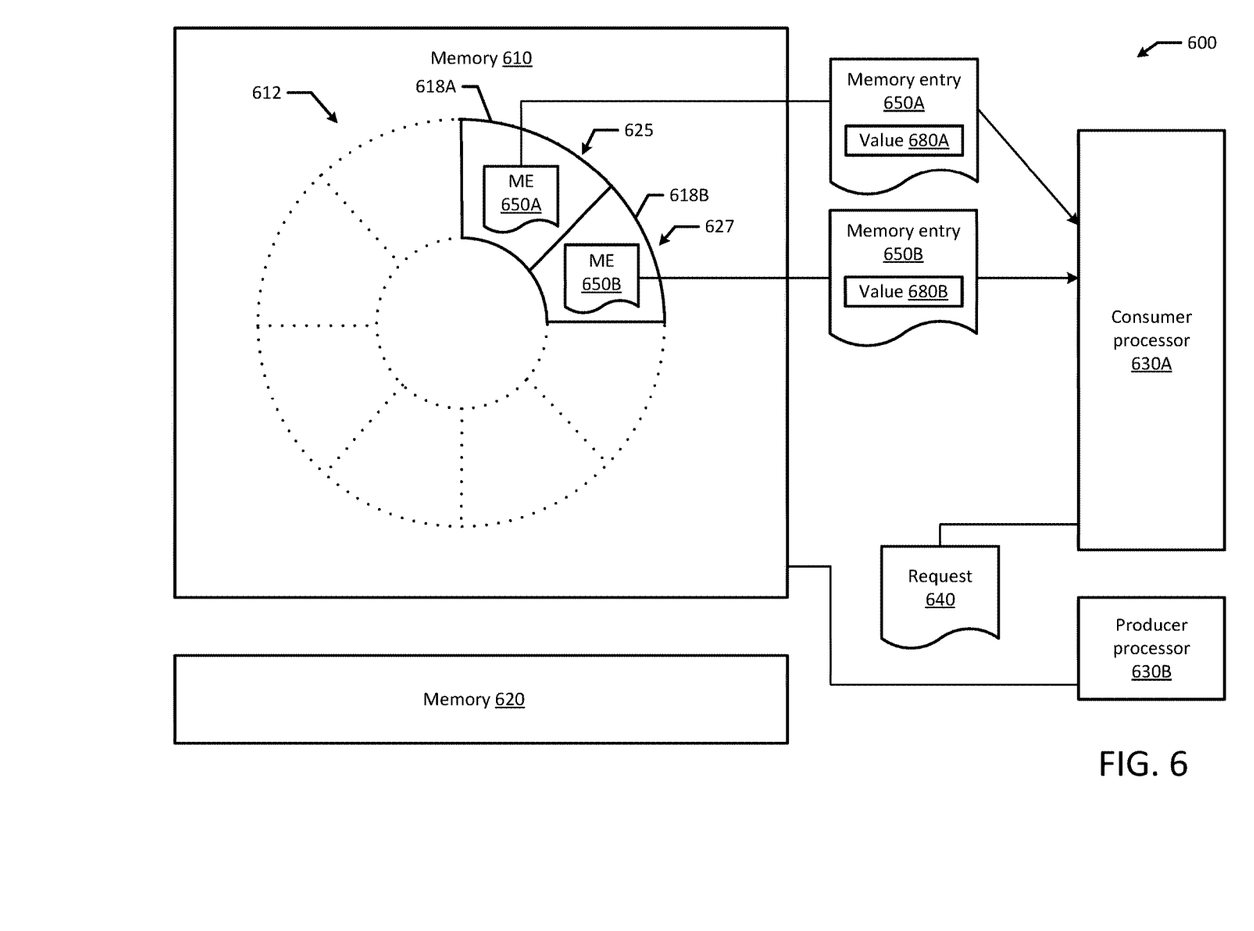
FIG. 6 illustrates a block diagram of an example reverse slot invalidation system according to an example embodiment of the present disclosure.

FIG. 6 is a block diagram of an example reverse slot invalidation system 600 according to an example embodiment of the present disclosure. The reverse slot invalidation system 600 includes a first memory 610 including a ring buffer 612 having a plurality of slots 618A-B. The ring buffer 612 may have any appropriate number of slots, which may vary depending on application. The reverse slot invalidation system 600 may also include a second memory 620 and at least one processor 630A-B in communication with the first memory 610. The at least one processor 630A-B includes a consumer processor 630A and a producer processor 630B. The consumer processor 630A may be configured to detect a request 640 to record at least one memory entry (e.g., memory entries 650A-B) in the second memory 620, retrieve up to a predetermined quantity (e.g., two) of memory entries in the ring buffer 612 from an original slot 625 (e.g., slot 618A) to an end slot 627 (e.g., slot 618B), and test a respective value (e.g., values 680A-B) of each successive slot (e.g., slots 618A-B). In this example, each respective value 680A-B may be associated with a corresponding respective memory entry 650A-B in each respective successive slot 618A-B from the original slot 625 (e.g., slot 618A) through the end slot 627 (e.g., slot 618B). Additionally, in this example, each successive slot 618A-B is tested from the original slot 625 through the end slot 627 while the respective value (e.g., values 680A-B) of each successive slot (e.g., slots 618A-B) in the ring buffer 612 remains unchanged. Responsive to receiving a valid value from the test, the consumer processor 630A may be configured to record the respective value in the second memory 620. Additionally, the consumer processor 630A may be configured to walk the ring buffer 612 backwards from the end slot 627 to the original slot 625, and invalidate each slot (e.g., slots 618A-B) between the end slot 627 and the original slot 625.

Instead of a cache line constantly bouncing between the producer processor 630B and consumer processor 630A, the consumer processor 630A advantageously retrieves and invalidates up to a predetermined quantity (e.g., 2, 3, 8, 16) of memory entries 650 or slots 618 at a time, thereby allowing multiple memory entry operations before the cache line bounces to the producer processor 630B, which improves performance and throughput without increasing the size of the ring buffer 612.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
  a first memory including a ring buffer having a plurality of slots;
  a second memory; and
  at least one processor in communication with the first memory, wherein the at least one processor includes a consumer processor and a producer processor, and the consumer processor is configured to:
    detect a request to record at least one memory entry in the second memory,
    retrieve up to a predetermined quantity of memory entries in the ring buffer from an original slot to an end slot,
    test a respective value of each successive slot from the original slot through the end slot while the respective value of each successive slot in the ring buffer remains unchanged, wherein each respective value is associated with a corresponding respective memory entry in each respective successive slot from the original slot through the end slot,
    responsive to receiving a valid value from the test, record the respective value in the second memory,
    walk the ring buffer backwards from the end slot to the original slot, and
    invalidate each slot between the end slot and the original slot.

2. The system of claim 1, wherein the predetermined quantity of memory entries are stored in a first quantity of slots.

3. The system of claim 2, wherein a second quantity of memory entries are retrieved, and the second quantity is less than the first quantity.

4. The system of claim 1, wherein the consumer processor is configured to detect the request from one of the virtual machine and the producer processor.

5. The system of claim 1, wherein the predetermined quantity of memory entries includes a first memory entry in the original slot, a second memory entry in an intermediate slot, and a third memory entry located in the end slot.

6. The system of claim 1, wherein the consumer processor and the producer processor are on different cores of the same physical processor.

7. The system of claim 1, wherein the consumer processor and the producer processor are different physical processors.

8. A method comprising:
   detecting, by a consumer processor, a request to record at least one memory entry from a first memory including a ring buffer in a second memory;
   retrieving, by the consumer processor, up to a predetermined quantity of memory entries in the ring buffer from an original slot to an end slot;
   testing, by the consumer processor, a respective value of each successive slot from the original slot through the end slot while the respective value of each successive slot in the ring buffer remains unchanged, wherein each respective value is associated with a corresponding respective memory entry in each respective successive slot from the original slot through the end slot;
   responsive to receiving a valid value from the test, recording, by the consumer processor, the respective value in the second memory;
   walking, by the consumer processor, the ring buffer backwards from the end slot to the original slot; and
   invalidating, by the consumer processor, each slot between the end slot and the original slot.

9. The method of claim 8, wherein the predetermined quantity of memory entries are stored in a first quantity of slots, the consumer processor retrieves a second quantity of memory entries, and the second quantity is less than the first quantity.

10. The method of claim 8, wherein the memory entries are packet addresses and the second memory is a virtual machine memory.

11. The method of claim 10, further comprising copying packet data into the VM memory from the retrieved packet addresses.

12. The method of claim 8, wherein walking the ring buffer backwards includes counting the quantity of memory entries as they are retrieved.

13. The method of claim 8, wherein walking the ring buffer backwards further includes decrementing a counter while walking the ring buffer backwards.

14. The method of claim 8, wherein invalidating each slot includes overwriting each slot with an invalid value, wherein the invalid value is a NULL value.

15. The method of claim 8, wherein the consumer processor detects a request from one of the virtual machine and the producer processor.

16. The method of claim 8, wherein the predetermined quantity of memory entries includes a first memory entry in the original slot, a second memory entry in an intermediate slot, and a third memory entry located in the end slot.

17. The method of claim 8, wherein the consumer processor stops testing responsive to receiving an invalid value from one of the successive slots from the original slot through the end slot.

18. The method of claim 8, wherein the consumer processor stops testing responsive to retrieving the predetermined quantity of memory entries in the ring buffer.

19. The method of claim 8, wherein a cache line bounce occurs after invalidating the original slot.

20. A non-transitory machine-readable medium storing code, which when executed by a consumer processor, is configured to:
   detect a request to record at least one memory entry from a first memory including a ring buffer in a second memory;
   retrieve up to a predetermined quantity of memory entries in the ring buffer from an original slot to an end slot;
   test a respective value of each successive slot from the original slot through the end slot while the respective value of each successive slot in the ring buffer remains unchanged, wherein each respective value is associated with a corresponding respective memory entry in each respective successive slot from the original slot through the end slot;
   responsive to receiving a valid value from the test, record the respective value in the second memory;
   walk the ring buffer backwards from the end slot to the original slot; and
   invalidate each slot between the end slot and the original slot.

* * * * *

UNITED STATES PATENT AND TRADEMARK OFFICE
CERTIFICATE OF CORRECTION

PATENT NO. : 10,216,453 B1  
APPLICATION NO. : 15/690774  
DATED : February 26, 2019  
INVENTOR(S) : Michael Tsirkin Page 1 of 1

It is certified that error appears in the above-identified patent and that said Letters Patent is hereby corrected as shown below:

In the Specification

In Column 4, Line 60, replace "(VIVID)" with --(VMD)--;

In Column 5, Line 20, replace "VIVID" with --VMD--.

Signed and Sealed this
Thirtieth Day of April, 2019

Andrei Iancu
*Director of the United States Patent and Trademark Office*